United States Patent [19]
Torres

[11] Patent Number: 5,122,168

[45] Date of Patent: Jun. 16, 1992

[54] C+P—500

[76] Inventor: Manuel R. Torres, 4773 Bradley Blvd., Chevy Chase, Md. 20815-6314

[21] Appl. No.: 640,223

[22] Filed: Jan. 11, 1991

[51] Int. Cl.$^5$ .............................................. B01D 19/00
[52] U.S. Cl. ...................................... 55/218; 55/244; 55/434
[58] Field of Search ................ 55/465, 470, 218, 439, 55/434, 244

[56] References Cited

U.S. PATENT DOCUMENTS

| 1,053,156 | 2/1913 | Campbell et al. | 55/470 |
| 1,162,851 | 12/1915 | Dewson | 55/244 |
| 2,539,257 | 1/1951 | Limberg | 55/465 |
| 3,272,651 | 9/1966 | Quirk | 55/465 |

*Primary Examiner*—Bernard Nozick

[57] ABSTRACT

An air pollution separator with a liquid to trap the particulate matter and gaseous contaminates in unhealthy, contaminated air by use of an external suction, which draws the contaminated air into, and thru a simplified flat element labyrinth which causes the contaminated air to cyclically pass repeatedly over and in contact with a collected water or liquid surface. The liquid surface repeatedly in contact with the contaminated air, picks up the particulate and gaseous matter from the air, and thus protects the expelling air from carrying the particulate and gaseous contaminate matter. The water in the drainage box and then is expelled through a vacuum interlock valve directly to the outside surrounding atmosphere, only when the vacuum is not operating.

4 Claims, 1 Drawing Sheet

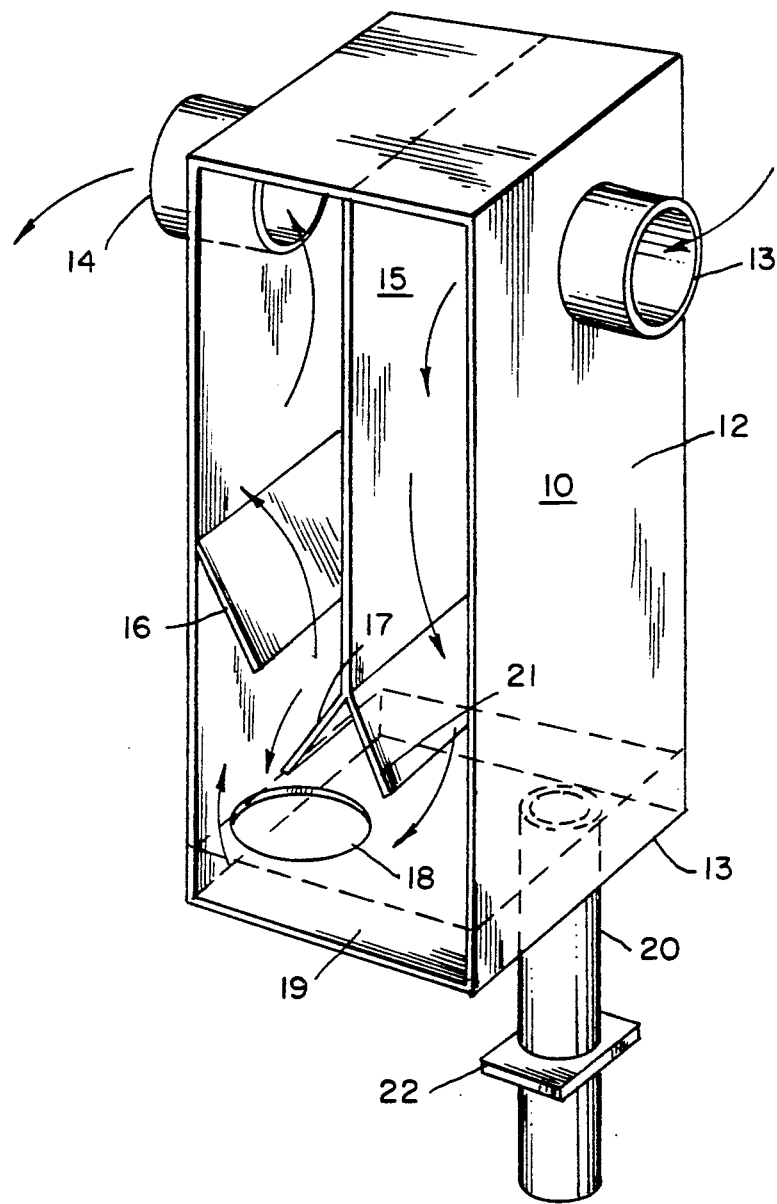

C+P—500

BACKGROUND OF INVENTION FIELD AND PRIOR ART

In the area of environment protection there have been developed differing devices to accomplish pollution contamination protection. Devices such as wet, wet and dry, and dry vacuum systems exist, all purporting to cut down on environmental pollution. Some of the prior devices accumulate water or liquid from the operating or cleaning action area and separate the air from the pollutants and then collect this water or liquid that has accumulated. In the case of the wet and dry vacuum systems normally the air that has been vacuumed and filtered is than expelled into the users room.

SUMMARY OF THE INVENTION

In the subject patent application, the liquid to trap the particulate matter and gaseous contaminates normally is accumulated, but may be pre-introduced to, a container or drainage box. The unhealthy, contaminated air then, by use of an external suction, draws the contaminated air into, and cause it to pass thru a simplified flat element labyrinth which causes the contaminated air to cyclically pass repeatedly over and in contact with the collected water or liquid surface. The liquid surface repeatedly in contact with the contaminated air, picks up the particulate and gaseous matter from the air, and thus protects the expelling air from carrying the particulate and gaseous contaminate matter. The water in the drainage box and then is expelled through a vacuum interlock valve directly to the outside surrounding atmosphere, only when the vacuum is not operating.

DESCRIPTION OF THE PRIOR ART

The prior art, includes commercial items such as;
a. the water coolers and aspirators of the company known as Halsey Taylor,
b. the —A-dec Century Uni-Chair —made by —a-dec—of 2601 Crestview Dr. Newberg Oregon 97132.
c. The aspirator shown in U.S. Pat. No. 3,138,873 of Bishop is somewhat typical of the art involved, that shows the exhausted air being returned to the room which suffers from the usual problem of only allowing a single pass over the accumulated liquid and,
d. In U.S. Pat. No. 3,484,942 directed to dental aspiration devices it fails to disclose to what place the air is evacuated, and also does not pass the air over the liquid several times, and does not have an automatically operated vacuum interlocked drainage valve.

DRAWINGS

FIG. 1 is an isometric drawing of the subject invention, in the upright position with the cover removed to see the interior baffles, and liquid pond, and the automatically operated vacuum interlocked drainage valve.

GLOSSARY

10 subject invention
11 inlet path, of supply air
12 side wall of the container
13 bottom of the container
14 exit path, of filtered air
15 median baffle
16 exit baffle
17 left branch of the inverted "Y" baffle
18 surface of the accumulated liquid pond
19 liquid at pond the bottom of the container
20 liquid drainage exit path tube
21 right branch of the inverted "Y" baffle
22 automatically operated vacuum interlocked drainage valve.
23 represents the cylindrical path of the air caused by the "Y" shaped baffle near the bottom of the generally "U" shaped path of the air.

DESCRIPTION OF THE PREFERRED EMBODIMENT

In the subject patent application, the invention 10, is shown in FIG. 1, which shows the liquid 19, which serves to trap the particulate matter and gaseous contaminates, may be already present in the drainage pond 19, or accumulated in, or pre-introduced to, this container or drainage pond 19. The unhealthy, contaminated air then, by use of an external suction force or pressure differential source, not shown, may draw the contaminated supply air into, and thru the inlet path 11, and then to pass thru a simplified flat panel labyrinth of general —Y— shaped cross-section, formed series of spaces, 15, 17, and 21, which because of the rectangle, having side walls 12, and bottom 13, which surrounds the inverted —Y— shape space, and causes the contaminated air to cyclically pass over the water or liquid surface 18, in an annular pattern or cylindrical path 23.

The box container 10, has a vertical median baffle 15, attached at the top of the box or container, and extending downward and terminating in an upside down "Y", which is formed of a left branch flat panel of the inverted "Y" 17, and a right branch flat panel of the inverted "Y" 21, all of which forms the labyrinth for the passing air flow, and causes the special cylindrical flow pattern below the inverted "Y" labyrinth portion. The "Y" shaped cross section median panel is characterized by an angle of 90 degrees plus or minus 10 degrees between the left branch flat panel of the inverted "Y" 17, and a right branch flat panel of the inverted "Y" 21,.

The liquid surface 18, is repeatedly placed in contact with the contaminated air and —picks up— or traps the particulate matter from the contact with the passing air, and thus protects the air expelling thru exit path of filtered air 14, from carrying the contamination, comprised of particulate and gaseous matter. The water accumulates in the drainage box 10, and then is expelled directly to the outside thru liquid exit pipe and valve 20, which operate in a known manner. By a vacuum operated interlock valve 22, the drainage is opened to drain the accumulated liquid contaminate mixture from time to time so that the drain is not open at the same time that the external vacuum force is being operated.

If the vacuum operated valve would be open at the same time that the vacuum force was operating, a second path of air would be introduced, allowing air to bubble up thru the liquid drainage exit path 20, and thru the surface of the liquid pond 19, and disrupt the cylindrical path of the air 23. This would completely defeat the smooth operation of the subject invention.

The flat panel inverted "Y" shaped cross-section median separator, located within said container 10, has one leg 15, of the "Y" attached to the top end of said container, mid way athwart and blocking the inlet 13, and outlet 14, paths at the line of attachment, and has the two branched spread portions 17, and 20, of the "Y"

shaped median separator located spaced from the surface of the liquids 18, at the bottom of the container, to form a generally "U" shaped elongated open path from the inlet path 13, thru the interior of the container across the surface of the bath liquids 18, to the outlet path 14. The spread of the two branched spread portions of the "Y" shaped median separator are spaced from the surface of the bath liquids and each other so as to substantially form an equilateral triangular prismatic chamber, athwart the bottom of the generally "U" shaped elongated open path from the inlet path thru the interior of the container to the outlet path The subtended angle between the branches of the said "Y" shaped cross section median panel can be adjusted to an angle of 90 degrees plus or minus 30 degrees to effect differing amounts co cylindrical action.

I claim:

1. An external vacuum operated wet bath, air contaminate separator, comprising;
   a substantially rectangular vertical box container, having a container inlet path means and a container outlet path means said inlet and outlet paths located at the top end of the rectangular vertical container opposite each other,
   a vacuum controlled drain valve means located in the bottom of the container, the vacuum controlled valve being closed at all times that the container is subject to a vacuum, and open at all other times,
   a portion of the container located at the bottom of the container adapted to accumulate or hold accumulated wet bath liquids, said portion of the container provided with the vacuum controlled drainage valve, for periodic removal of said wet bath liquids, responsive to the cessation of the presence of the vacuum,
   a flat panel inverted "Y" shaped cross-section median separator means, said flat panel "Y" shaped cross-section separator, located within said container, and having one leg of the "Y" attached to the top end of said container, mid way athwart and blocking the inlet and outlet paths at the line of attachment, and having the two branched spread portions of the "Y" shaped median separator located spaced from the surface of the liquids at the bottom of the container, to form a generally "U" shaped elongated open path from the inlet path means thru the interior of the container across the surface of the bath liquids to the outlet path.

2. A device as in claim 1 wherein the subtended angle between the branches of the said "Y" shaped cross section median panel is characterized by an angle of 90 degrees plus or minus 10 degrees.

3. An external vacuum operated wet bath, air contaminate separator, comprising;
   a substantially rectangular vertical box container, having a container inlet path means and a container outlet path means said inlet and outlet paths located at the top end of the rectangular vertical container opposite each other,
   a vacuum controlled drain valve means located in the bottom of the container, the vacuum controlled valve being closed at all times that the container is subject to a vacuum, and open at all other times,
   a portion of the container located at the bottom of the container adapted to accumulate or hold accumulated wet bath liquids, said portion of the container provided with the vacuum controlled drainage valve, for periodic removal of said wet bath liquids, responsive to the cessation of the presence of the vacuum,
   a flat panel inverted "Y" shaped cross-section median separator means, said flat panel "Y" shaped cross-section separator, located within said container, and having one leg of the "Y" attached to the top end of said container, mid way athwart and blocking the inlet and outlet paths at the line of attachment, and having the two branched spread portions of the "Y" shaped median separator located spaced from the surface of the liquids at the bottom of the container, to form a generally "U" shaped elongated open path from the inlet path means thru the interior of the container across the surface of the bath liquids to the outlet path, and wherein the spread of the two branched spread portions of the "Y" shaped median spearator are spaced from the surface of the bath liquids and each other as to substantially form an equilateral triangular prismatic chamber, athwart the bottom of the generally "U" shaped elongated open path from the inlet path means thru the interior of the container to the outlet path.

4. A device as in claim 3, wherein the subtended angle between the branches of the said "Y" shaped cross section median panel is further characterized by an angle of 90 degrees plus or minus 30 degrees.

* * * * *